United States Patent
Asao et al.

(10) Patent No.: US 7,271,135 B2
(45) Date of Patent: Sep. 18, 2007

(54) LUBRICANT GREASE FOR LOW AND HIGH TEMPERATURE APPLICATION AND ROLLING BEARING

(75) Inventors: Mitsunari Asao, Kuwana (JP); Masaki Egami, Kuwana (JP)

(73) Assignee: NTN Corporation, Osaka (JP)

( * ) Notice: Subject to any disclaimer, the term of this patent is extended or adjusted under 35 U.S.C. 154(b) by 510 days.

(21) Appl. No.: 10/820,311

(22) Filed: Apr. 8, 2004

(65) Prior Publication Data

US 2004/0198612 A1    Oct. 7, 2004

(30) Foreign Application Priority Data

Apr. 30, 2003  (JP)  ............................ P2003-125657
Jan. 9, 2004   (JP)  ............................ P2004-003571

(51) Int. Cl.
*C10M 169/02* (2006.01)
*C10M 171/02* (2006.01)
*F16C 17/00* (2006.01)
*F16C 29/04* (2006.01)
*F16C 33/10* (2006.01)

(52) U.S. Cl. ..................... 508/182; 508/528; 384/322; 384/368; 384/420

(58) Field of Classification Search ............... 508/182, 508/528; 384/322, 368, 420
See application file for complete search history.

(56) References Cited

U.S. PATENT DOCUMENTS 6,673,750 B2 * 1/2004 Hirata et al. ................. 508/136

FOREIGN PATENT DOCUMENTS

| JP | 2002-327759 | 11/2002 |
| JP | 2004-003596 | 1/2004 |
| JP | 2004-0026941 | 1/2004 |
| WO | WO97/47710 | 12/1997 |

* cited by examiner

*Primary Examiner*—Anhtuan T. Nguyen
*Assistant Examiner*—Amy T. Lang
(74) *Attorney, Agent, or Firm*—Hedman & Costigan, PC; James V. Costigan

(57) ABSTRACT

A rolling bearing, for application in electric auxiliaries for a car, durable owing to high resistance to high temperatures and capable of restraining noises from being generated at low temperatures; and lubricant grease, for low and high temperature application, which can be sealed in the rolling bearing. The lubricant grease includes 100 parts by weight of a mixture of fluorine-containing lubricant grease containing perfluoropolyether oil as a base oil thereof and fluorocarbon resin powder as a thickening agent thereof and urea-containing lubricant grease containing polyester oil as a base oil thereof and a urea compound as a thickening agent thereof; and 3 to 30 parts by weight of polyolefin oil added to the mixed grease. The polyolefin oil has a pour point of not more than −50° C. and a kinematic viscosity of 10 to 70 $mm^2/s$ at 40° C.

12 Claims, 1 Drawing Sheet

LUBRICANT GREASE FOR LOW AND HIGH TEMPERATURE APPLICATION AND ROLLING BEARING

BACKGROUND OF THE INVENTION

The present invention relates to lubricant grease for low and high temperature application and to a rolling bearing. More particularly, the present invention relates to the lubricant grease that can be applied suitably for electric auxiliaries used for cars at low and high temperatures and the rolling bearing.

The lubricant grease is sealed in the rolling bearing to impart lubricant property thereto. The lubricant grease is obtained by kneading abase oil and a thickening agent both serving as its main component. As the base oil, mineral oil and synthetic oil such as ester oil, silicone oil, and ether oil are used. As the thickening agent, metal soap such as lithium soap and urea compounds are generally used. The lubricant grease contains additives such as an antioxidant, a rust preventive, a metal deactivator, and a viscosity index improver as necessary.

In recent years, there are growing demands for production of a car which is compact, lightweight, and has low degree of noise. Therefore efforts are made to produce electric component parts for the car which are compact, lightweight, and have low degree of noise and make the interior of the engine room airtight. To do so, the electric component parts are required to have high output and efficiency. Because the life of the lubricant grease to be sealed in the rolling bearing is shorter than the life of the rolling bearing caused by its fatigue, the life of the rolling bearing depends on the life of the lubricant grease. Therefore the temperature to which the lubricant grease used for electric auxiliaries is resistant should be higher than the temperature to which urea-containing lubricant grease is resistant.

Heretofore heat-resistant fluorine-containing lubricant grease containing fluorocarbon resin powder as its thickening agent and perfluoropolyether oil as its base oil is used as grease to be sealed in the rolling bearing for use in a fan clutch which is heated to high temperatures in the neighborhood of 200° C. But the fluorine-containing lubricant grease is expensive and prevents reduction of the cost of the rolling bearing.

Therefore hybrid grease containing a mixture of the fluorine-containing lubricant grease and the urea-containing lubricant grease has been developed, as disclosed in Japanese Patent Laid-Open Nos. 2002-327759, 2004-3596, and 2004-26941. A lubricant grease composition having a preferable noise-reducing effect at temperatures of 180° C. to 250° C. is also known, as disclosed in Japanese Patent Laid-Open No. 2000-514105.

However, the conventional fluorine-containing lubricant grease generates noises at low temperatures when the fluorine-containing lubricant grease is used for electric auxiliaries.

When the viscosity of the base oil is reduced to restrain noises from being generated at low temperatures by the fluorine-containing lubricant grease, noises are decreased at low temperatures. But the fluorine-containing lubricant grease containing the base oil is not durable at high temperatures in the neighborhood of 200° C.

SUMMARY OF THE INVENTION

The present invention has been made to cope with the above-described problems. Accordingly, it is an object of the present invention to provide lubricant grease, for low and high temperature application, which is durable owing to high resistance to high temperatures and capable of restraining noises from being generated at low temperatures and a rolling bearing in which the lubricant grease is sealed.

The lubricant grease, according to the present invention, for low and high temperature application includes 100 parts by weight of mixed grease and 3 to 30 parts by weight of polyolefin oil added to the mixed grease. The mixed grease contains fluorine-containing lubricant grease containing (a) perfluoropolyether oil as a base oil thereof and fluorocarbon resin powder as a thickening agent thereof and (b) urea-containing lubricant grease containing polyester oil as a base oil thereof and a urea compound as a thickening agent thereof.

The polyolefin oil has a pour point of not more than −50° C. and a kinematic viscosity of 10 to 70 $mm^2/s$ at 40° C.

The urea-containing lubricant grease has an evaporation amount not more than 25 wt %, when the urea-containing lubricant grease is left at 200° C. for 250 hours.

The polyester oil is an aromatic ester compound of monovalent alcohol having 7 to 22 carbon atoms and aromatic tricarboxylic or tetracarboxylic acid or derivatives thereof and/or an aliphatic ester compound of monovalent carboxylic acid having 7 to 22 carbon atoms and trimetylolpropane, pentaerythritol or dipentaerythritol.

The polyester oil is an aromatic ester compound of monovalent alcohol having 7 to 22 carbon atoms and aromatic tricarboxylic or tetracarboxylic acid or derivatives thereof.

The rolling bearing of the present invention has an inner ring, an outer ring concentric with the inner ring, a plurality of rolling elements disposed between the inner ring and the outer ring, and lubricant grease sealed on the periphery of the rolling elements. The lubricant grease to be sealed is the above-described grease for low and high temperature application.

By adding 3 to 30 parts by weight of the polyolefin oil to 100 parts by weight of the mixture of the fluorine-containing lubricant grease containing the perfluoropolyether oil as its base oil and the fluorocarbon resin powder as its thickening agent and the urea-containing lubricant grease containing the polyester oil as its base oil and the urea compound as its thickening agent, it is possible to keep the fluorine-containing lubricant grease heat-resistant and suppress the generation of noises at low temperatures. By using the aromatic ester compound as the polyester oil, it is possible to reduce the cost of manufacturing the lubricant grease.

DETAILED DESCRIPTION OF THE PREFERRED EMBODIMENTS

Figure 1:
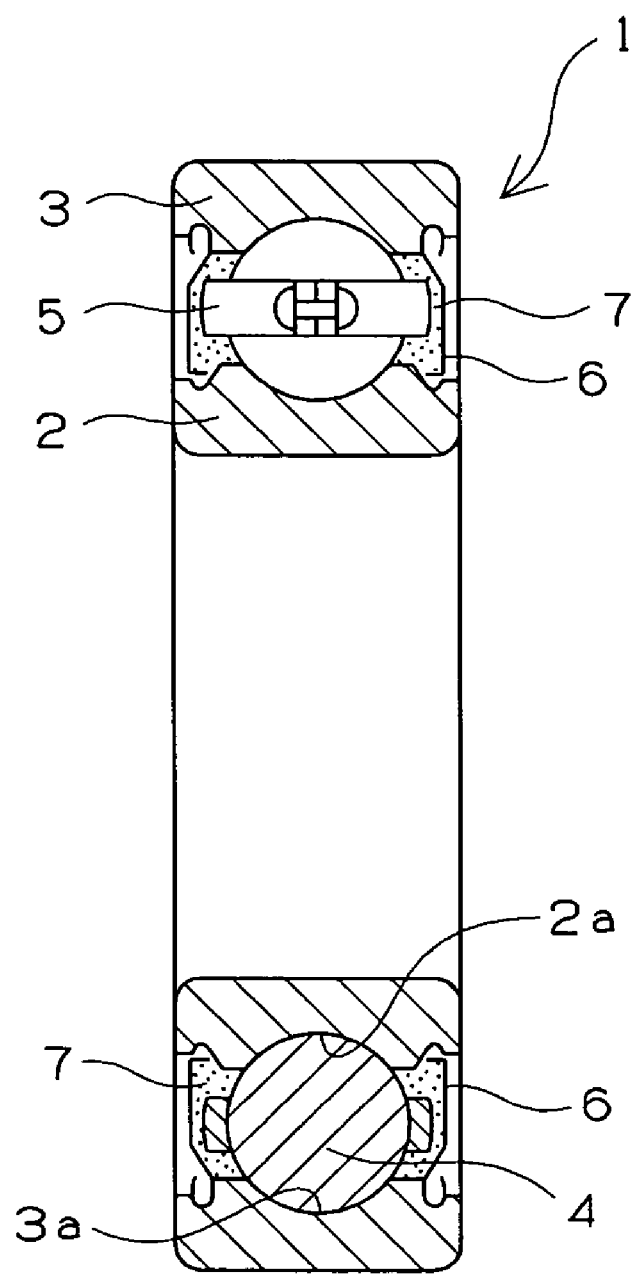
FIG. 1 is a sectional view showing a deep groove ball bearing.

Fluorine-containing lubricant grease that can be used in the present invention contains perfluoropolyether oil as its base oil and fluorocarbon resin powder as its thickening agent.

As the perfluoropolyether oil, it is possible to use compounds formed by replacing hydrogen atoms of aliphatic hydrocarbon polyether with fluorine atoms. As perfluoropolyether oil having this structure, perfluoropolyether, shown by chemical formulas 1 and 2, having side chains and straight-chain perfluoropolyether shown by chemical formulas 3 through 5 can be used. These perfluoropolyethers can be used singly or as a mixture. Reference symbols n and m of the chemical formulas 1 through 5 indicate integers.

As the perfluoropolyether oil shown by the chemical formula 1, Fomblin Y (commercial name: produced by Solvay Solexis Inc.) is commercially available. As the perfluoropolyether oil shown by the chemical formula 2, Krytox (commercial name: produced by Du-Pont Inc.) and Barrierta J oil (commercial name: produced by KLUEBER Inc.) are commercially available. As the perfluoropolyether oil shown by the chemical formula 3, Fomblin Z (commercial name: produced by Solvay Solexis Inc.) is commercially available. As the perfluoropolyether oil shown by the chemical formula 4, Fomblin M (commercial name: produced by Solvay Solexis Inc.) is commercially available. As the perfluoropolyether oil shown by the chemical formula 5, Demnum (commercial name: produced by Daikin Industries, Ltd.) is commercially available.

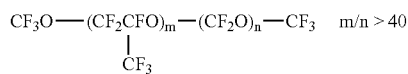

$$CF_3O\text{—}(CF_2CFO)_m\text{—}(CF_2O)_n\text{—}CF_3 \quad m/n > 40$$
$$|$$
$$CF_3$$

Chemical formula 1

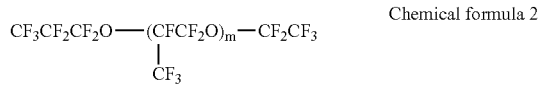

$$CF_3CF_2CF_2O\text{—}(CFCF_2O)_m\text{—}CF_2CF_3$$
$$|$$
$$CF_3$$

Chemical formula 2

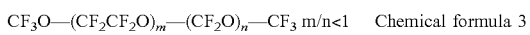

$$CF_3\text{—}(CF_2CF_2O)_m\text{—}(CF_2O)_n\text{—}CF_3 \quad m/n<1$$ Chemical formula 3

$$CF_3O\text{—}(CF_2CF_2O)_m\text{—}(CF_2O)_n\text{—}CF_3 \quad m/n>1$$ Chemical formula 4

$$F\text{—}(CF_2CF_2CF_2O)_n\text{—}CF_2CF_3$$ Chemical formula 5

As for the fluorocarbon resin powder, it can be served as the thickening agent of the fluorine-containing lubricant grease, under the condition of high affinity for the perfluoropolyether oil, good stability at high temperatures and resistance to chemicals.

As fluorocarbon resin, the following perfluorocarbon resins are preferable: polytetrafluoroethylene (PTFE), tetrafluoroethylene-perfluoroalkylvinyl ether copolymer (PFA), and tetrafluoroethylene-hexafluoropropylene copolymer (FEP). The polytetrafluoroethylene (PTFE) is particularly preferable because it is excellent in stability at high temperatures and resistance to chemicals.

It is preferable that for 100 wt % of the entire amount of the fluorine-containing lubricant grease, 70 to 90 wt % of the perfluoropolyether oil and 10 to 30 wt % of the fluorocarbon resin powder are mixed with each other. This mixing ratio allows the fluorine-containing lubricant grease to have a penetration at which it has a small leak amount and a low torque which can be kept for a long time, when the fluorine-containing lubricant grease is sealed in a rolling bearing.

Urea-containing lubricant grease that can be used in the present invention contains polyester oil as its base oil and an urea compound as its thickening agent.

As the polyester oil serving as the base oil of the urea-containing lubricant grease, at least one of the following esters is used: ester of aliphatic monovalent alcohol having 7 to 22 carbon atoms and aromatic tricarboxylic or tetracarboxylic acid or derivatives thereof and ester of aliphatic monovalent carboxylic acid having 7 to 22 carbon atoms and trimetylolpropane, pentaerythritol or dipentaerythritol. In addition, polymer ester may be used as the base oil of the urea-containing lubricant grease.

The aliphatic monovalent alcohol and the aliphatic monovalent carboxylic acid having less than 7 or more than 22 carbon atoms are inferior in lubricating properties.

As the aliphatic monovalent alcohol having 7 to 22 carbon atoms, it is possible to use heptyl alcohol, octyl alcohol, nonyl alcohol, decyl alcohol, undecylic alcohol, lauryl alcohol, oleyl alcohol, and stearyl alcohol and the like.

As the aliphatic monovalent carboxylic acid having 7 to 22 carbon atoms, it is possible to use monovalent carboxylic acid obtained by replacing a group —$CH_2OH$ of the aliphatic monovalent alcohol with a group —COOH.

As the aromatic tricarboxylic acid, the aromatic tetracarboxylic acid, and derivatives thereof, it is possible to use trimellitic acid, trimesic acid, pyromellitic acid, biphenyltetracarboxylic acid, benzophenonetetracarboxylic acid, and acid anhydride thereof.

The urea-containing lubricant grease that can be used in the present invention contains the urea compound as its thickening agent.

As the urea compound, diurea having two urea bonds in its molecule is preferable and is shown by a chemical formula 6 shown below:

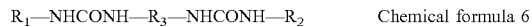

$$R_1\text{—NHCONH—}R_3\text{—NHCONH—}R_2 \qquad \text{Chemical formula 6}$$

where $R_3$ is an aromatic group; $R_1$ and $R_2$ are selected one among an aliphatic group, an alicyclic group, and an aromatic group respectively; $R_1$ and $R_2$ are to be the same or different from each other. As a method of producing the urea compound, a diisocyanate compound and an amine compound having an equivalent weight of isocyanate group are reacted with each other.

In addition to the diurea, polyurea or the like can be also used as the thickening agent of the urea-containing lubricant grease.

It is preferable that for 100 wt % of the entire amount of the urea-containing lubricant grease, 70 to 95 wt % of the ester oil and 30 to 5 wt % of the urea compound are mixed with each other. This mixing ratio allows the urea-containing lubricant grease to have a penetration at which it has a small leak amount and preferable lubricating properties which can be kept for a long time, when the urea-containing lubricant grease is sealed in a bearing.

The evaporation amount of the urea-containing lubricant grease is not more than 25 wt %. If the evaporation amount is more than 25 wt %, it is impossible to make the evaporation amount of a mixture of the urea-containing lubricant grease and the fluorine-containing lubricant grease low, for example, not more than 15 wt %.

In the present invention, in finding the evaporation amount, after about 5 g of grease is collected in a beaker made of glass having a volume of 50 ml conforming to the Japanese Industrial Standard (JIS) R3503, the grease is left for 250 hours in a constant-temperature oven (internal volume: 90 liters, airflow: 5.1 m$^3$/min, wind velocity: 0.42m/s), with internal air circulation, set to 200° C. The initial weight of the grease and the weight thereof after it is left for 250 hours are measured to find the evaporation amount from an equation shown below:

Evaporation amount (%)={ (Initial weight-Weight after left for 250 hours)/Initial weight}×100

A mixture of the urea-containing lubricant grease and the fluorine-containing lubricant grease contains in the range from 30 wt % to 75 wt % of the urea-containing lubricant grease. If the mixing ratio of the urea-containing lubricant grease exceeds 75 wt %, the evaporation amount of the mixed grease increases. If the mixing ratio of the urea-containing lubricant grease is less than 30, it is impossible to reduce the cost of the manufacturing the lubricant grease. One mixed grease contains 25 to 70 wt % of said fluorine-containing lubricant grease and 30 to 75 wt % of said urea-containing lubricant grease.

In the present invention, polyolefin oil having a pour point of not more than −50° C. and a kinematic viscosity of 10 to 70 mm$^2$/s at 40° C. is added at 3 to 30 parts by weight, favorably 3 to 20 parts by weight, more favorably 3 to 15 parts by weight to 100 parts by weight of the mixture of the fluorine-containing lubricant grease and the urea-containing lubricant grease. When the mixing ratio of the polyolefin oil is less than 3 parts by weight, the lubricant grease is heat-resistant, but causes noises to be generated at low temperatures. When the mixing ratio of the polyolefin oil is more than 30 parts by weight, the lubricant grease does not causes noises to be generated at low temperatures but is inferior in heat resistance.

The polyolefin oil that can be used in the present invention is liquid polyolefin shown by chemical formulas 7 and 8:

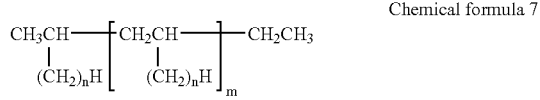

Chemical formula 7 where n is integers of 4 to 16, and m is integers of 1 to 6.

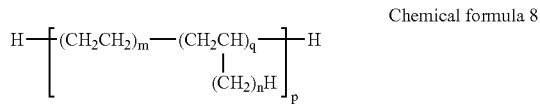

Chemical formula 8 where n is integers of 1 to 8, m is integers of 1 to 3, q is integers of 1 to 3, and p is integers which vary in dependence on the viscosity of the polyolefin oil.

The polyolefin oil stays liquid at ordinary temperature. The polyolefin oil has a pour point of not more than −50° C. and a kinematic viscosity of 10 to 70 mm$^2$/s at 40° C. Because the polyolefin oil has a kinematic viscosity of 10 to 70 mm$^2$/s, it is capable of restraining noises from being generated at low temperatures and is heat-resistant.

FIG. 1 shows an example of the rolling bearing of the present invention. FIG. 1 is a sectional view of a deep groove ball bearing. A rolling bearing 1 includes an inner ring 2 having an inner ring rolling surface 2a on its peripheral surface, an outer ring 3 concentric with the inner ring 2 and having an outer ring rolling surface 3a on its inner peripheral surface, and a plurality of rolling elements 4 disposed between the inner ring rolling surface 2a and the outer ring rolling surface 3a. The rolling bearing 1 further includes a holder 5 holding the rolling elements 4 and a sealing member 6 fixed to the outer ring 3. A grease 7 for low and high temperature application is sealed on, at least, the periphery of the rolling elements 4.

The lubricant grease 7 is durable owing to high resistance to high temperatures and capable of restraining noises from being generated at low temperatures. Therefore the lubricant grease 7 can be applied suitably for rolling bearings of electric component parts of a car such as an alternator, an electromagnetic clutch for a car air conditioner, an intermediate pulley, an electromotive fan motor, a fan clutch and electric auxiliaries.

EXAMPLE

Reference Example 1

Preparation of Grease 1

For 100 wt % of the entire amount of the grease, 33 wt % of fluorocarbon resin powder was added to 67 wt % of perfluoropolyether oil having a kinematic viscosity of 191 mm$^2$/s at 40° C. Thereafter the mixture was stirred and supplied to a roll mill. Thereby a semisolid grease 1 containing the fluorocarbon resin powder serving as its thickening agent and perfluoropolyether oil serving as its base oil was obtained.

Reference Example 2

Preparation of Grease 2

For 100 wt % of the entire amount of the grease, 33 wt % of fluorocarbon resin powder was added to 67 wt % of perfluoropolyether oil having a kinematic viscosity of 90 mm$^2$/s at 40° C. Thereafter the mixture was stirred and supplied to the roll mill. Thereby a semisolid grease 2 containing the fluorocarbon resin powder serving as its thickening agent and perfluoropolyether oil serving as its base oil was obtained.

Reference Example 3

Preparation of Grease 3

For 100 wt % of the entire amount of the grease, one mol of diphenylmethane diisocyanate was dissolved in one half amount of 88 wt % of aromatic ester oil having a kinematic viscosity of 91 mm$^2$/s at 40° C. Thereafter two mols of octylamine was dissolved in the other half amount of the aromatic ester oil. The mixture of the octylamine and the aromatic ester oil was added to the base oil containing the diphenylmethane diisocyanate and the aromatic ester oil, while stirring was being carried out. The stirring continued for reaction at 100 to 120° C. for 30 minutes. As a result, 12 wt % of an urea compound deposited in the base oil. Thereafter the mixture was supplied to the roll mill. Thereby a semisolid grease 3 containing the urea compound serving as its thickening agent and the aromatic ester oil serving as its base oil was obtained. When the grease 3 was left at 200° C. for 250 hours, the evaporation amount of the grease 3 was 17.4 wt %.

Reference Example 4

Preparation of Grease 4

For 100 wt % of the entire amount of the grease, one mol of diphenylmethane diisocyanate was dissolved in one half amount of 80 wt % of alkyl diphenyl ether having a kinematic viscosity of 100 mm$^2$/s at 40° C. Thereafter two mols of p-toluidine was dissolved in the other half amount of the alkyl diphenyl ether. The mixture of the p-toluidine and the alkyl diphenyl ether was added to the base oil containing the diphenylmethane diisocyanate and the alkyl diphenyl ether, while stirring was being carried out. The stirring continued for reaction at 100 to 120° C. for 30 minutes. As a result, 20 wt % of an urea compound deposited in the base oil. Thereafter the mixture was supplied to the roll mill. Thereby a semisolid grease 4 containing the urea compound serving as its thickening agent and the alkyl diphenyl ether serving as its base oil was obtained. When the grease 4 was left at 200° C. for 250 hours, the evaporation amount of the grease 4 was 31.0 wt %.

Polyolefin oil used in each of the examples and comparison examples is shown below.

Polyolefin oil 1: The pour point is −57° C. The kinematic viscosity at 40° C. is 46 mm$^2$/s. The kinematic viscosity at 100° C. is 7.8 mm$^2$/s (produced by Nippon Steel Chemical Co., Ltd., commercial name; Shinfluid 801).

Polyolefin oil 2: The pour point is −73° C. The kinematic viscosity at 40° C. is 17 mm$^2$/s. The kinematic viscosity at 100° C. is 3.9mm$^2$/s (produced by Nippon Steel Chemical Co., Ltd., commercial name; Shinfluid 401).

Polyolefin oil 3: The pour point is −53° C. The kinematic viscosity at 40° C. is 63 mm$^2$/s (produced by Idemitsu Petrochemical Co., Ltd., commercial name; Idemitsu PAO 5010).

Polyolefin oil 4: The pour point is −73° C. The kinematic viscosity at 40° C. is 5 mm$^2$/s. The kinematic viscosity at 100° C. is 1.7 mm$^2$/s (produced by Nippon Steel Chemical Co., Ltd., commercial name; Shinfluid 201).

Polyolefin oil 5: The pour point is −35° C. The kinematic viscosity at 40° C. is 420 mm$^2$/s (produced by Exxon Mobil Corp., commercial name; Mobil SHF401).

Examples 1 through 8 and Comparison Examples 1 through 9

The grease and the polyolefin were mixed and kneaded at the ratios shown in tables 1 and 2 to obtain the lubricant grease, of each of the examples and the comparison examples, for low and high temperature application.

The penetration and dropping point of each lubricant grease were measured. The cost per volume was also computed by setting the cost per volume of the lubricant grease of the comparison example 1 to one. Tables 1 and 2 show the results.

Each lubricant grease for low and high temperature application was sealed in a bearing 6203LLHA cleaned with petroleum benzine to obtain a rolling bearing of each example and comparison example. Each lubricant grease occupied 38% of the volume of the entire space in the bearing. The obtained rolling bearing was left in a low-temperature bath of −60° C. When the temperature of the rolling bearing itself became −60° C., it was taken out from the bath and placed in an atmosphere having room temperature. The rolling bearing was rotated at 2700 rpm (outer ring) under a radial load of 127 N to examine whether noises were generated before the rolling bearing became the room temperature. Results are shown in tables 1 and 2.

Each lubricant grease for low and high temperature application was sealed in a bearing 6204ZZ cleaned with petroleum benzine to obtain a rolling bearing of each example and comparison example. Each lubricant grease occupied 38% of the volume of the entire space in the bearing. The obtained bearing was evaluated in a high-temperature durability test.

In the high-temperature durability test, the bearing was rotated under a radial load of 67 N and a thrust load of 67 N and at 10000 rpm and 180° C. to measure how long it took until a motor was stopped because of an overload. Results are shown in tables 1 and 2.

TABLE 1

| | Example | | | | | | | |
|---|---|---|---|---|---|---|---|---|
| | 1 | 2 | 3 | 4 | 5 | 6 | 7 | 8 |
| Component (parts by weight) | | | | | | | | |
| Grease 1 | 40 | 40 | 40 | 40 | 40 | 40 | 40 | 40 |
| Grease 2 | — | — | — | — | — | — | — | — |
| Grease 3 | 60 | 60 | 60 | 60 | 60 | 60 | 60 | 60 |
| Grease 4 | — | — | — | — | — | — | — | — |
| Polyorefin oil 1 | 3 | 5 | 10 | — | — | 12 | 15 | 20 |
| Polyorefin oil 2 | — | — | — | 3 | — | — | — | — |
| Polyorefin oil 3 | — | — | — | — | 3 | — | — | — |
| Properties | | | | | | | | |
| Penetration | 348 | 358 | 360 | 350 | 348 | 315 | 310 | 311 |
| Dropping Point, ° C. | ≧250 | ≧250 | ≧250 | ≧250 | ≧250 | ≧250 | ≧250 | ≧250 |
| Noise at low temperature | N | N | N | N | N | N | N | N |
| High-temp. durability test (180° C.), h | ≧4000 | ≧4000 | ≧4000 | ≧4000 | ≧4000 | ≧4000 | ≧4000 | ≧4000 |
| Cost | 0.4 | 0.4 | 0.4 | 0.4 | 0.4 | 0.4 | 0.4 | 0.4 |

N: Not generated

TABLE 2

| | Comparison Example | | | | | | | | |
|---|---|---|---|---|---|---|---|---|---|
| | 1 | 2 | 3 | 4 | 5 | 6 | 7 | 8 | 9 |
| Component (parts by weight) | | | | | | | | | |
| Grease 1 | 100 | — | — | 40 | 40 | 40 | 40 | 40 | 40 |
| Grease 2 | — | 100 | — | — | — | — | — | — | — |
| Grease 3 | — | — | 100 | 60 | 60 | 60 | 60 | 60 | — |
| Grease 4 | — | — | — | — | — | — | — | — | 60 |
| Polyorefin oil 1 | — | — | — | — | 2 | 35 | — | — | 10 |

TABLE 2-continued

|  | Comparison Example | | | | | | | | |
|---|---|---|---|---|---|---|---|---|---|
|  | 1 | 2 | 3 | 4 | 5 | 6 | 7 | 8 | 9 |
| Polyorefin oil 4 | — | — | — | — | — | — | 5 | — | — |
| Polyorefin oil 5 | — | — | — | — | — | — | — | 5 | — |
| Properties |  |  |  |  |  |  |  |  |  |
| Penetration | 282 | 285 | 283 | 280 | 350 | 370 | 352 | 365 | 240 |
| Dropping Point, ° C. | ≧250 | ≧250 | ≧250 | ≧250 | ≧250 | ≧250 | ≧250 | ≧250 | 246 |
| Noise at low temperature | Gen. | N | Gen. | Gen. | Gen. | N | N | Gen. | N |
| High-temp. durability test (180° C.), h | ≧4000 | 3500 | 1400 | ≧4000 | ≧4000 | 1600 | 2000 | ≧4000 | 580 |
| Cost | 1.0 | 1.0 | 0.1 | 0.4 | 0.4 | 0.4 | 0.4 | 0.4 | 0.3 |

Gen: Generated
N: Not generated

The lubricant grease, according to the present invention, for low and high temperature application contains the polyolefin oil added to the mixed grease of the fluorine-containing lubricant grease and the urea-containing lubricant grease. Therefore by applying the lubricant grease for electric auxiliaries of a car and the like used at low and high temperatures, the lubricant grease is durable owing to high resistance to high temperatures and capable of restraining noises from being generated at low temperatures.

Consequently the lubricant grease can be used suitably for rolling bearings for a fan clutch which is heated to very high temperatures in the vicinity of 180° C. and an alternator which is used at high temperatures.

What is claimed is:

1. Lubricant grease for low and high temperature application, comprising a mixed grease and polyolefin oil, wherein said mixed grease comprises fluorine-containing lubricant grease containing perfluoropolyether oil as a base oil thereof and fluorocarbon resin powder as a thickening agent thereof and urea-containing lubricant grease containing polyester oil as a base oil thereof and a urea compound as a thickening agent thereof, wherein 3 to 30 parts by weight of said polyolefin oil is added to 100 parts by weight of said mixed grease, and said polyolefin oil has a pour point of not more than −50° C. and a kinematic viscosity of 20 to 70 mm²/s at 40°.

2. Lubricant grease according to claim 1, wherein said urea-containing lubricant grease has an evaporation amount not more than 25 wt %, when said urea-containing lubricant grease is kept at 200° C. for 250 hours.

3. Lubricant grease according to claim 2, wherein said polyester oil is an aromatic ester compound of monovalent alcohol having 7 to 22 carbon atoms and aromatic tricarboxylic or tetracarboxylic acid or derivatives thereof and/or aliphatic ester compound of monovalent carboxylic acid having 7 to 22 carbon atoms and trimethylolproprane, pentaerythritol or dipentaerythritol.

4. Lubricant grease according to claim 3, wherein said polyester oil is an aromatic ester compound of monovalent alcohol having 7 to 22 carbon atoms and aromatic tricarboxylic or tetracarboxylic and acid or derivatives thereof.

5. Lubricant grease according to claim 2, wherein a urea compound serving as a base oil of said urea-containing lubricant grease is shown by a chemical formula below:

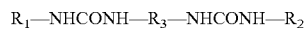

where $R_3$ is an aromatic group; $R_1$ and $R_2$ are selected one among an aliphatic group, and alicyclic group, and an aromatic group respectively; $R_1$ and $R_2$ are to be the same or different from each other.

6. Lubricant grease according to claim 2, wherein for 100 wt % of an entire amount of said urea-containing lubricant grease, 70 to 95 wt % of said ester oil and 30 to 5 wt % of said urea compound are mixed with each other.

7. Lubricant grease according to claim 1, wherein 100 wt % of an entire amount of said fluorine-containing lubricant grease, 70 to 90 wt % of said perfluoropolyether oil and 10 to 30 wt % of said fluorocarbon resin powder are mixed with each other.

8. Lubricant grease according to claim 7, wherein said fluorocarbon resin powder is polytetrafluoroethylene resin powder.

9. Lubricant grease according to claim 1, wherein said mixed grease contains 25 to 70 wt % of said fluorine-containing lubricant grease and 30 to 75 wt % of said urea-containing lubricant grease.

10. Lubricant grease according to claim 1, wherein said mixed grease is applied for electric auxiliaries for a car.

11. A rolling bearing comprising an inner ring; an outer ring concentrate with said inner ring; a plurality of rolling elements disposed between the inner ring and said outer ring; and lubricant grease sealed on a periphery of said rolling elements, wherein said lubricant grease is the grease for low and high temperature application according to claim 1.

12. A rolling bearing according to claim 11, wherein said rolling bearing is applied for electric auxiliaries of a car.

* * * * *